June 4, 1929.  E. SANDNER  1,715,953
DEVICE FOR DAMPING TORSIONAL VIBRATIONS
Filed Aug. 4, 1927  2 Sheets-Sheet 1
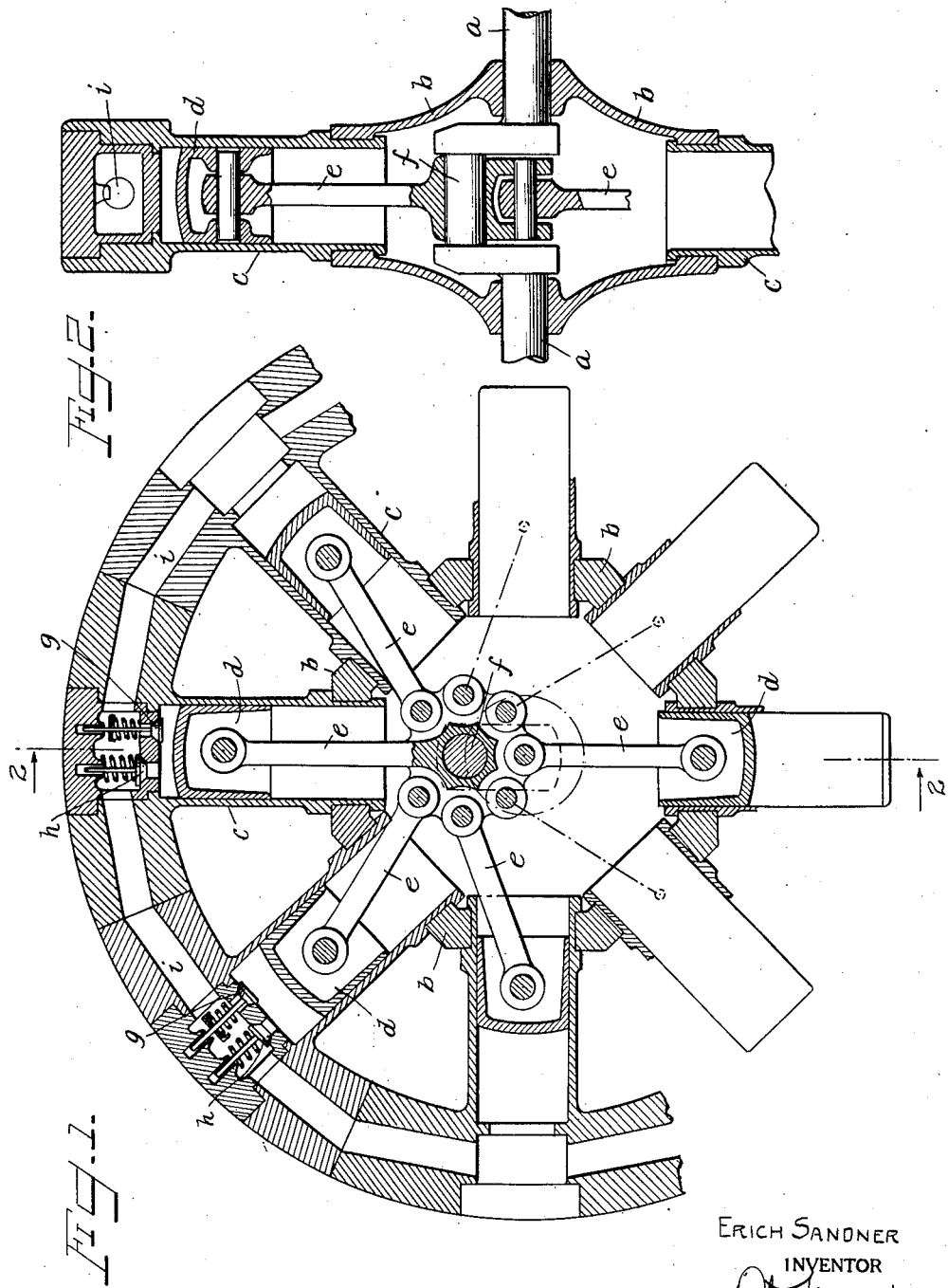
ERICH SANDNER
INVENTOR
BY
his ATTORNEY June 4, 1929.  E. SANDNER  1,715,953
DEVICE FOR DAMPING TORSIONAL VIBRATIONS
Filed Aug. 4, 1927   2 Sheets-Sheet 2
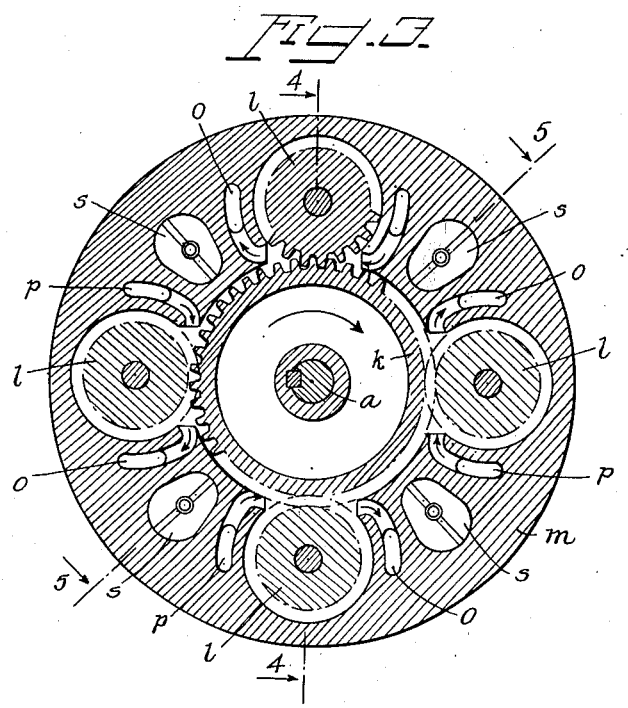
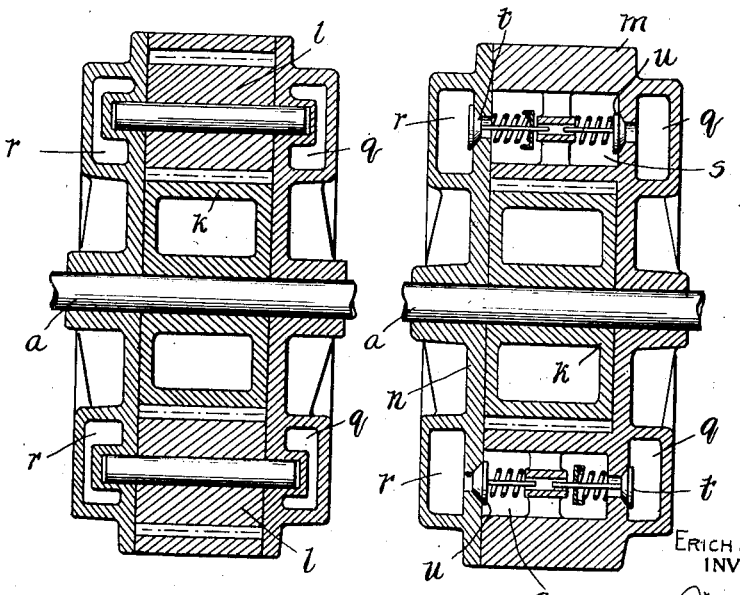
ERICH SANDNER.
INVENTOR
BY
his ATTORNEY.

Patented June 4, 1929.

1,715,953

UNITED STATES PATENT OFFICE.

ERICH SANDNER, OF KOBE, JAPAN.

DEVICE FOR DAMPING TORSIONAL VIBRATIONS.

Application filed August 4, 1927, Serial No. 210,608, and in Germany December 4, 1925.

If two or more masses are fixed on a shaft on which pulsating forces are acting, torsional vibrations will occur as soon as the pulsating (exciting) forces synchronize with the natural period of vibration of the shaft system. Such torsional vibrations create additional torsional stresses on certain parts of the shaft, which stresses are liable to become so large that a fracture of the shaft will occur when running for a long time within critical ranges; even a frequent passing through critical ranges may cause undesirably high strain in the shafting.

It is not always possible to choose the dimensions of the shaft and the size and location of the masses so that the dangerous critical vibrations are placed entirely outside the running range of the shaft and for such cases, devices are sought for by which a damping effect of the unavoidable oscillations and, therefore, a reduction of the torsional strain of the shaft can be attained.

Many devices have been suggested, for example, which consist of an additional flywheel being placed loosely on the shaft, preferably at a place where the amplitudes of the torsional vibrations are large; this flywheel will be in connection with a driving piece, fixed on the shaft, by the medium of some liquid or electric current or the like; as soon as the driving piece is subjected to torsional vibrations, the additional flywheel, owing to its kinetic energy, will produce some braking effect on the driving piece. The action of such a device can best be illustrated in the following manner, whereby it may be necessary to point out that it is without concern for the development of a torsional vibration whether the shaft is rotating or not; let us consider that the driving piece is rigidly fastened on the shaft at a place as stated above, and provided with a number of radial arms on which are fastened blades in such a manner that the plain surfaces are situated in the direction of the axis of the shaft; the driving piece would, therefore, have an appearance similar to the wheel of a side-paddle steamer. The driving piece may be considered to be surrounded by a hermetically closed receptacle of appropriate weight (flywheel effect) which is situated so that it can turn on the shaft and the receptacle to be completely filled with some liquid; it may further be assumed that by the arrangement of ribs, partitions or by some other means the resistance offered by the liquid will be increased when a relative motion takes place between the driving piece and the receptacle, the latter representing the additional flywheel. A rigid connection between the shaft and the additional flywheel does not exist under any conditions of running; it is, on the contrary, possible to turn the flywheel slowly forth and back on the shaft (at least to a certain extent) without any noticeable force. As is easily comprehended, resistance can be produced only if the driving piece with its blades begins to oscillate in the liquid and that, with a given design and size of the device, this resistance will be increased the quicker the blades swing and the larger the amplitudes of the oscillation and it is further evident that a noticeable damping effect can only be obtained with a comparatively large mass of the additional flywheel. Inasmuch as the oscillations take place mostly with a very high frequency and as the additional flywheel must be rather heavy, it results that considerable forces will come into action upon the driving piece fixed on the shaft. Practical experience with damping devices, built on the principle as described above, has proved that either the damping effect was too small or that the forces which necessarily had to be taken up by the driving piece were so big that some fracture occurred in a short time.

With another known method of damping critical oscillations, an additional flywheel is also placed on the shaft, if possible, at a place where the amplitudes are largest, but, in a state of standstill, this flywheel is not seated loosely on the shaft but is held fast, for instance, by means of friction. The simplest design may be imagined to consist of a flywheel, situated so that it can revolve on the shaft, which is pressed (e. g. by spring pressure) against a light driving plate rigidly mounted on the shaft the pressure being so adjusted that the resulting friction is just sufficient to force the additional flywheel to partake in all the irregularities of angular velocity of the shaft that may occur under ordinary running conditions without slipping so that, for these running conditions, the additional flywheel may be considered as rigidly coupled with the shaft; as soon as the shaft is made to run in a critical range, the driving plate will have a tendency to oscillate with high frequency and with large amplitudes but the friction between the driving plate and the heavy flywheel is supposed to be too small for the latter to follow the motions of the driving plate; the flywheel will, consequently, slip. Although this kind of a damper may, at first sight, resemble very much a device as described in the preceding paragraph, the action is, nevertheless, entirely different. With damping devices of the first described principle, i. e. with a loosely seated additional flywheel, the location of the critical ranges will not be materially altered, even when the flywheel has come into action, as only the masses that can be considered as rigidly coupled with the shaft will influence the natural period of vibration of the system. With the other kind of dampers conditions are different; here it was a presupposition that during ordinary running conditions the additional flywheel will act as though it were rigidly connected with the shaft; this fundamental distinction between the two methods must result in a different frequency of the natural number of oscillations when both devices are applied in turn on the same shaft and with the same moment of inertia of the additional flywheel; the natural number of oscillations per minute will be lower with a flywheel of the last described design; at the frequency of impulses at which an oscillation would develop with a flywheel attached to the shaft according to the method mentioned in the first place, no critical vibration whatever can take place with a flywheel held fast e. g. by friction; at a correspondingly lower frequency, the preconditions for the development of torsional oscillations are surely given also in the latter case but as soon as the amplitudes exceed a certain limit, the additional flywheel will slip at every oscillation and in the moment of slipping the conditions for the critical vibration are changed because, with the flywheel slipping, the natural period of vibration of the system would be higher and, therefore, at the number of revolutions of (or number of impulses on) the shaft at which a torsional oscillation would certainly occur if the flywheel were rigidly fastened, these oscillations cannot develop to their full extent. It is impossible with the latter method that large forces come into action on the driving plate or on the shaft for, quite obviously, the forces are in any case limited by the turning moment at which the flywheel is slipping. The principal distinction between the two methods may be summarized as follows: with the first described device, the torsional oscillations which take place at a certain rotative speed, or at a certain number of impulses, are damped by putting some braking action upon the shaft at a place where the amplitudes are large, while, with the other device, the preconditions for the development of a critical vibration are disturbed. As stated before, the additional flywheel must be made rather heavy and the oscillations take place mostly at a very high frequency; for this reason a simple mechanical friction coupling cannot be used for larger dimensions of the flywheel because the slipping surfaces would be ruined in a short time; it has further been proved by practical tests that, for a given shaft system, the most advantageous result can be obtained only when the additional flywheel is made to slip at a distinct and rather closely confined turning moment; this condition cannot be very well accomplished with an ordinary friction coupling because the turning moment at which the flywheel will slip is liable to vary considerably according to the state of the sliding surfaces; the coefficient of friction depends further on the relative speed between the sliding surfaces.

It is the aim of the present invention, by making use of the last described principle of damping, to produce a special coupling between the driving plate and the additional flywheel which, in critical ranges, will allow a slipping of even very heavy flywheels during any length of time without causing undue heating, ruining of sliding surfaces or any other detrimental effect and without any possibility of alteration of the precisely adjusted turning moment at which the device begins to slip.

According to the invention, an additional fly-wheel is put on the shaft as near as possible to the place where the amplitudes are the largest, this flywheel being connected with the shaft by means of a coupling designed similar to a positive acting rotary water- (or oil-) pump the outlet valves of which are so loaded (e. g. by springs) that they will not open unless so large a turning moment is to be transmitted to the flywheel that is possible to occur only when torsional vibrations take place. Instead of an additional flywheel, any gyrating mass already in existence on the shaft (e. g. the rotor of an electric generator) can be used.

The accompanying drawings illustrate two methods of carrying out my invention, in which—

Figure 1 is a fragmentary cross-section of a device embodying a series of radially arranged piston pumps;

Figure 2 is a cross-sectional view taken substantially along the line 2—2 of Figure 1;

Figure 3 is a cross-sectional view of a device embodying a series of toothed gear pumps;

Figure 4 is a cross-sectional view taken substantially along the line 4—4 of Figure 3; and Figure 5 is a view similar to Figure 4 taken substantially along the line 5—5 of Figure 3.

In Figures 1 and 2, the rotating shaft $a$ in which torsional vibrations are to be minimized, is provided with a crank having a crank pin $f$, the latter being arranged at a point on the shaft where the latter oscillates with large amplitudes during critical running conditions. Loosely and rotatably mounted upon the shaft is a hollow carrier or casing $b$, the latter being provided with the series of radial cylinders $c$. In each cylinder there is a piston $d$, and the pistons are all connected by rods $e$ to the crank pin $f$. The pistons $d$ and the cylinders $c$ constitute complementary pumping members which are permanently associated respectively with the shaft $a$ and with the casing $b$.

In each cylinder, there is a spring-loaded suction valve $g$ and a spring-loaded outlet valve $h$. The cylinder heads, in which these valves are arranged, are hollow, and these heads have segmental enlargements which are joined to each other by bolts or otherwise so as to form a sort of fly-wheel rim. In the latter, a series of channels $i$ communicate with the hollow cylinder heads to form a common and continuous chamber designed to be completely filled with a liquid such as oil, glycerine, or the like. The cylinder chambers, above the pistons, are also filled with this liquid.

The springs of the outlet valves $h$ are of such strength as to retain these valves closed under normal running conditions. As a result, under normal pressure on the part of the pistons, the complementary pumping members are prevented from moving relative to each other and the cylinders therefore rotate with the shaft as though they were in physically rigid association therewith. Generally, the shaft rotation is not entirely uniform but is subject to a sort of pulsation; accordingly, the springs must be sufficiently strong to enable the cylinders to take part in this pulsation and to remain in rigid association with the shaft under normal conditions.

When critical speeds are reached, the torsional oscillations of the shaft increase in magnitude, and inasmuch as these oscillations have a comparatively high frequency, it would require a substantial increase of energy to accelerate the system. The necessity for such energy is obviated, however, because of the fact that the outlet valve springs $h$ are so constructed as to yield when the enlarged torsional oscillations are initiated. Accordingly, the cylinders take part in the oscillations only to a limited extent, the yielding of the springs $h$ serving to permit relative movement between the complementary pumping members $d$ and $c$. During such relative movement, oil or other liquid is exhausted from some of the cylinders and an approximately equal amount is drawn into the other cylinders.

In the annular chamber or conduit at the rim, the pressure should be comparatively low, as for example, one atmosphere.

In Figures 3–5, I have illustrated a device wherein the positive-action pumps corresponding to the piston pumps of Figures 1 and 2 are provided in the form of gear wheel pumps.

In this construction, the shaft whose oscillations are to be dampened or minimized when these oscillations acquire large amplitudes at critical speeds, is provided with a rigidly attached gear wheel $k$. This gear meshes with a number of relatively smaller gears $l$ arranged at spaced points around the periphery thereof. The gears $l$ are pivoted in the casing $m$ and the cover $n$. The device consists, therefore, of several toothed gear pumps which are concentrically arranged around a common toothed driving wheel. The casing $m$ with its cover $n$ is mounted on the shaft so that they can revolve. Assuming that the shaft with the driving wheel $k$ is moving in the direction of the arrow with relation to the casing and that the entire interior is filled with some liquid (e. g. lubricating oil or glycerine) the liquid would be forced into the ports $o$ while at the same time an equivalent quantity of liquid will be sucked in through ports $p$; when the relative direction of rotation is reversed, the passages $p$ become the outlet ports and the passages $o$ become the suction ports. All the ports $o$ discharge into a common chamber $q$ arranged in the casing while the ports $p$ are in connection with a similar chamber $r$ in the cover. Some collecting chambers $s$ are situated between the chambers $q$ and $r$ which are closed each with a suction valve $t$ and an outlet valve $u$ against the chambers $q$ and $r$ these valves being arranged in such manner that two of the collecting rooms $s$ have their suction valve and the other two collecting rooms have their outlet valve directed towards chamber $q$; with regard to chamber $r$, these valves are placed in reverse order. The inlet valves are provided with springs customary with automatic suction valves while the outlet valves are pressed on their seats by heavy springs so that no liquid can pass out of either chamber $q$ or $r$ unless the hydraulic pressure produced exceeds a certain limit; consequently, the casing $m$ with cover $n$ will be forced to move together with the wheel $k$; as a matter of fact, the casing can be considered as rigidly coupled with the shaft as long as the hydraulic pressure does not exceed an amount corresponding to the tension of the springs of the outlet valves $u$.

It will be readily understood that the action of the device of Figures 3–5 is quite similar to that described in connection with Figures 1 and 2.

Summarizing the action of my invention, it will be seen that the torsional oscillations set up by resonance between the shaft and the pulsating torque which acts upon the shaft are dampened and minimized by the provision of bodies which function as though they were rigidly associated with the shaft under normal non-resonant conditions; and the provision of means for releasing this rigid association when resonant oscillations are initiated. In other words, as long as the oscillations remain below a certain predetermined amplitude, the auxiliary fly-wheel constituted of the casing and cylinders, or casing and small gear wheels, remains in fixed association with the shaft and constitutes a part thereof so far as the natural period of oscillation is concerned. When the torsional oscillations acquire, under resonant conditions, amplitudes which are so great that the accelerating energy which would be required to make the bodies take part in the high-frequency pulsations exceeds the energy which couples the bodies to the shaft, relative movement takes place between the fly-wheel and the shaft. When such relative movement takes place, and the bodies are no longer in rigid association with the shaft, the very factors which determined the natural period of oscillation of the shaft and which therefore induced the resonant conditions, are altered, and as a result resonance is destroyed and serious critical vibrations are thus prevented from developing.

What I claim as my invention is:

1. In combination with a shaft subjected to a pulsating torque, a device for minimizing the torsional oscillations of the shaft during times of resonance between the latter and said pulsations, said device comprising a fly-wheel associated with the shaft at a point of maximum oscillation and means for (a) retaining the fly-wheel in rigid association with the shaft during non-resonant conditions and (b) automatically releasing said fly-wheel from such rigid association upon initiation of resonance, said means comprising a set of positive-action hydraulic pumps arranged around the shaft, said pumps comprising complementary pumping members carried by the shaft and fly-wheel respectively, and means for preventing relative movement of the pumping members, and hence of the shaft and fly-wheel, during non-resonant conditions.

2. In combination with a shaft subjected to a pulsating torque, a device for minimizing the torsional oscillations of the shaft during times of resonance between the latter and said pulsations, said device comprising a fly-wheel associated with the shaft at a point of maximum oscillation and means for (a) retaining the fly-wheel in rigid association with the shaft during non-resonant conditions and (b) automatically releasing said fly-wheel from such rigid association upon initiation of resonance, said means comprising a set of positive-action hydraulic pumps arranged around the shaft, said pumps comprising complementary pumping members carried by the shaft and fly-wheel respectively, and means for preventing relative movement of the pumping members, and hence of the shaft and fly-wheel, during non-resonant conditions; said last-named means comprising a spring-closed valve in each pump, said spring yielding only under the hydraulic pressure produced by resonant oscillations.

3. In combination with a shaft subjected to a pulsating torque, a device for minimizing the torsional oscillations of the shaft during times of resonance between the latter and said pulsations, said device comprising a fly-wheel associated with the shaft at a point of maximum oscillation and means for (a) retaining the fly-wheel in rigid association with the shaft during non-resonant conditions and (b) automatically releasing said fly-wheel from such rigid association upon initiation of resonance, said means comprising a set of positive-action hydraulic pumps arranged around the shaft, each pump having an inlet and outlet valve and comprising complementary pumping members carried by the shaft and fly-wheel respectively, and means yieldable only under conditions of resonant oscillation for retaining said valves closed, whereby relative movement of the pumping members, and hence of the shaft and fly-wheel, is prevented during non-resonant conditions.

4. In combination with a shaft subjected to a pulsating torque, a device for minimizing the torsional oscillations of the shaft during times of resonance between the latter and said pulsations, said device comprising a fly-wheel associated with the shaft at a point of maximum oscillation and means for (a) retaining the fly-wheel in rigid association with the shaft during non-resonant conditions and (b) automatically releasing said fly-wheel from such rigid association upon initiation of resonance, said means comprising a set of positive-action hydraulic pumps arranged around the shaft, each pump having an inlet and outlet valve and comprising complementary pumping members carried by the shaft and fly-wheel respectively, a common supply and discharge chamber for said pumps, and spring means yieldable only under the hydraulic pressure produced by resonant oscillations for retaining said valves closed.

5. In combination with a shaft subjected to a pulsating torque, a device for minimizing the torsional oscillations of the shaft during times of resonance between the latter and said pulsations, said device comprising a fly-wheel associated with the shaft at a point of maximum oscillation and means for (a) retaining the fly-wheel in rigid association with the shaft during non-resonant conditions and (b) automatically releasing said fly-wheel from such rigid association upon initiation of resonance, said means comprising a set of positive-action gear wheel pumps arranged around the shaft, said pumps comprising a set of pumping members carried by the fly-wheel and a common complementary pumping member carried by the shaft, and means for preventing relative movement between the common pumping member and the other pumping members, and hence of the shaft and fly-wheel, during non-resonant conditions.

In testimony whereof I hereunto affix my signature.

ERICH SANDNER.